May 9, 1944.  J. P. GOLDEN ET AL  2,348,466
COUPLER CENTERING AND PIPE CONTROL DEVICE
Filed March 10, 1942   3 Sheets-Sheet 1
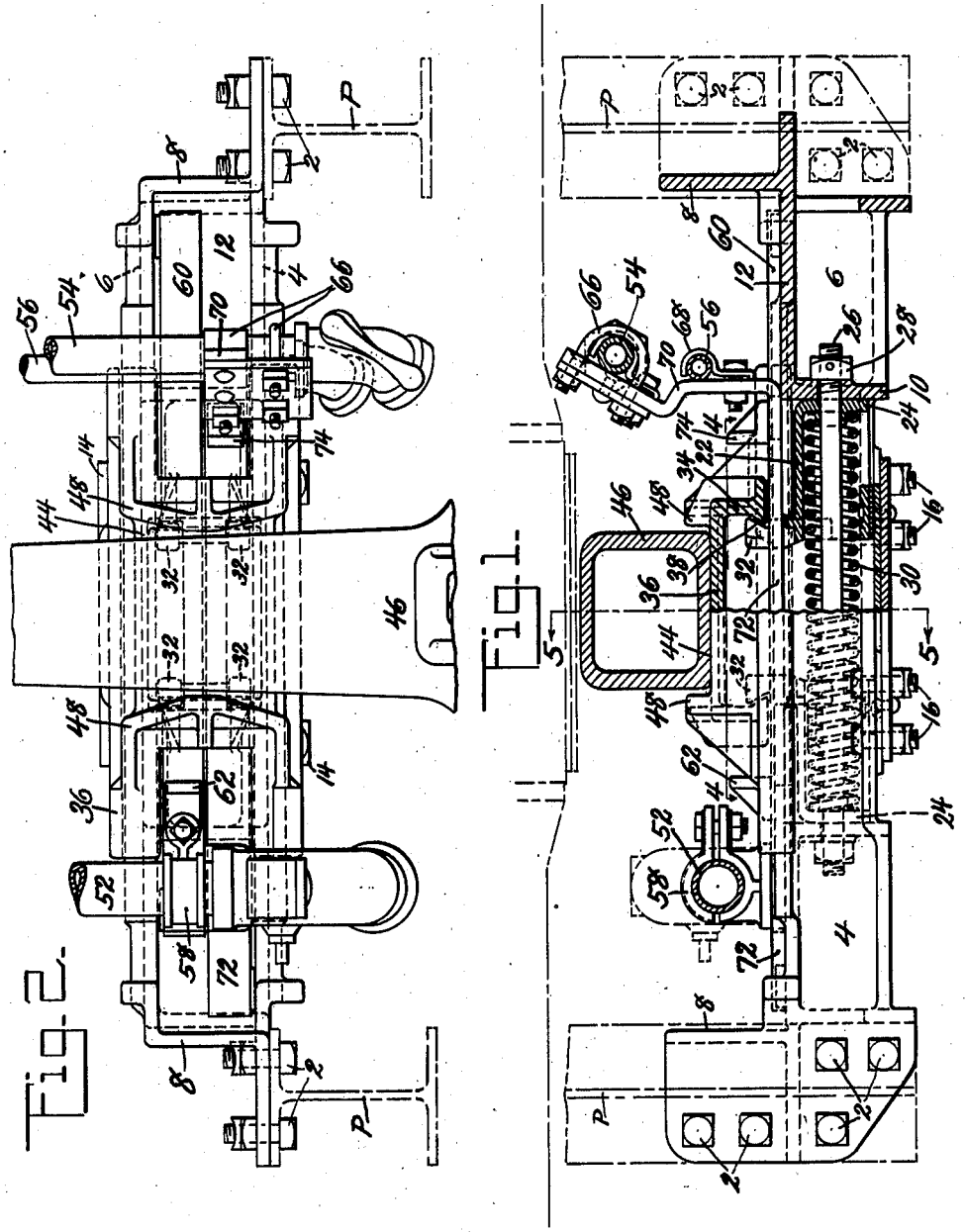
INVENTORS
James P. Golden
Glennon A. Meyer
BY Donald N. Rich ATTORNEY May 9, 1944.   J. P. GOLDEN ET AL   2,348,466
COUPLER CENTERING AND PIPE CONTROL DEVICE
Filed March 10, 1942   3 Sheets-Sheet 2
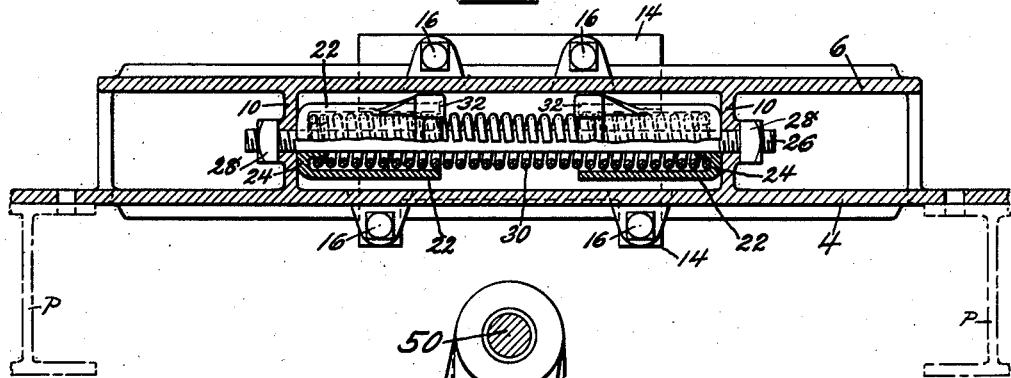
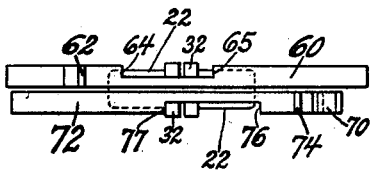
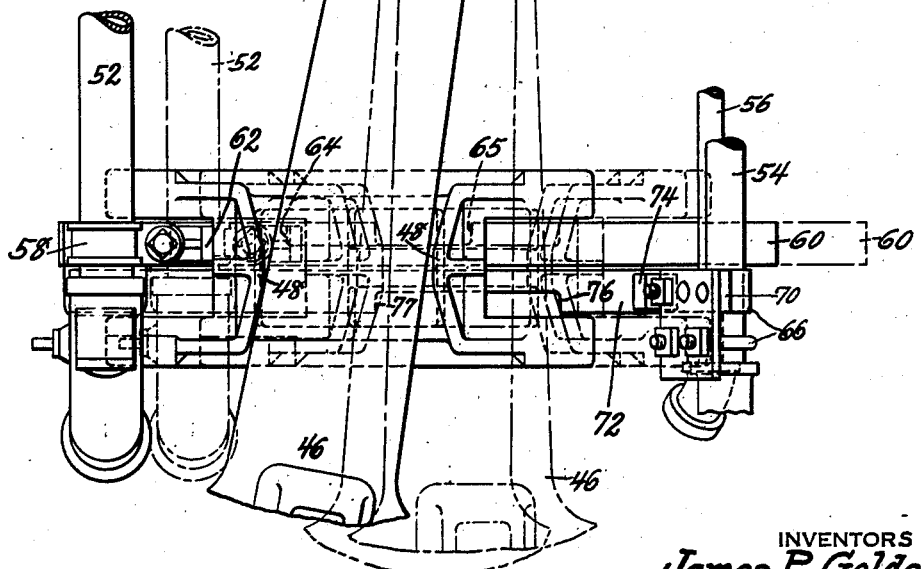
INVENTORS
James P. Golden
Glennon A. Meyer
BY Donald H. Rich ATTORNEY May 9, 1944.　　　J. P. GOLDEN ET AL　　　2,348,466
COUPLER CENTERING AND PIPE CONTROL DEVICE
Filed March 10, 1942　　　3 Sheets-Sheet 3

INVENTORS
James P. Golden
Glennon A. Meyer
BY Donald U. Rich ATTORNEY

Patented May 9, 1944

2,348,466

UNITED STATES PATENT OFFICE 2,348,466

COUPLER CENTERING AND PIPE CONTROL DEVICE

James P. Golden and Glennon A. Meyer, St. Charles, Mo., assignors to American Car and Foundry Company, New York, N. Y., a corporation of New Jersey Application March 10, 1942, Serial No. 434,036

7 Claims. (Cl. 213—21)

This invention relates to coupler centering devices in general and in particular to such devices for use on passenger cars where piping must be moved in conjunction with the coupler.

In the past coupler centering devices for passenger cars have been built with the pipes either directly carried by the centering device or carried by slides directly contacting the coupler. In either case the pipes were continually submitted to bending stresses and the slides were in constant motion during travel of the car, since every small movement of the coupler was transmitted to the slides and piping. Further, in most cases the piping had to move in conjunction with the coupler and, therefore, was submitted to bending stresses in each direction. It is an object, therefore, of the present invention to provide a coupler centering device and pipe control in which the pipes move only on the side toward which the coupler is swinging.

A further object of the invention is the provision of a coupler centering and pipe control device in which the pipes are unaffected by small movements of the coupler.

A still further object of the invention is the provision of a coupler centering and pipe control device in which lost motion connections are provided to eliminate wear on the parts and reduce the bending of the pipes.

These and other objects of the invention will be apparent to persons skilled in the art from a study of the following description and accompanying drawings, in which:

Figure 1 is an end view of the improved device with parts in section to better disclose the construction;

Fig. 2 is a plan view of the improved construction;

Fig. 3 is a sectional view taken substantially on line 3—3 of Fig. 5 and showing the centering spring arrangement;

Fig. 6 is a plan view of the improved device showing the position of parts when the coupler has swung to the left;

Fig. 8 is a plan view showing more clearly the relationship of the slides and spring followers when the parts are in the full line position of Fig. 6.

Figure 5:
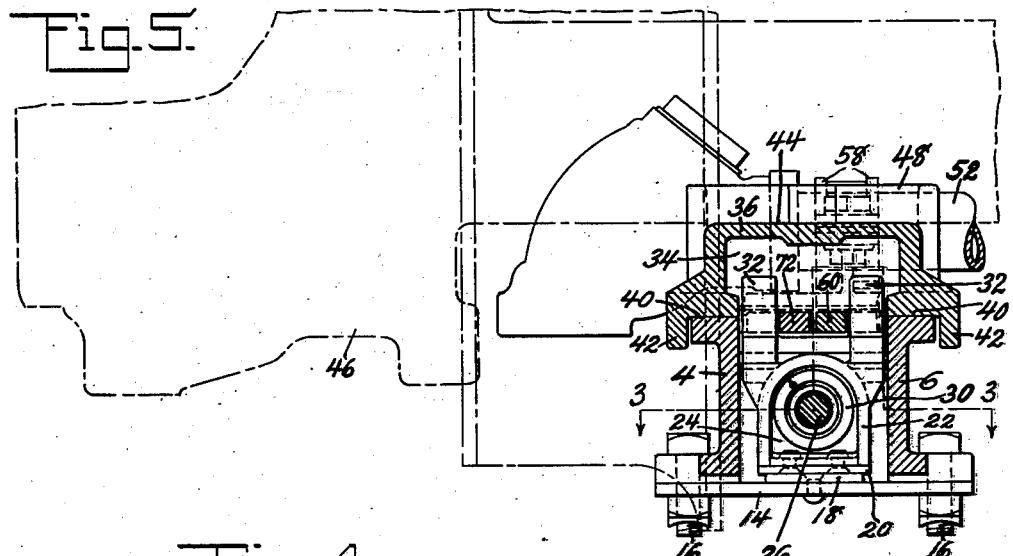
Fig. 5 is a longitudinal sectional view taken substantially on line 5—5 of Fig. 1.
Figure 4:
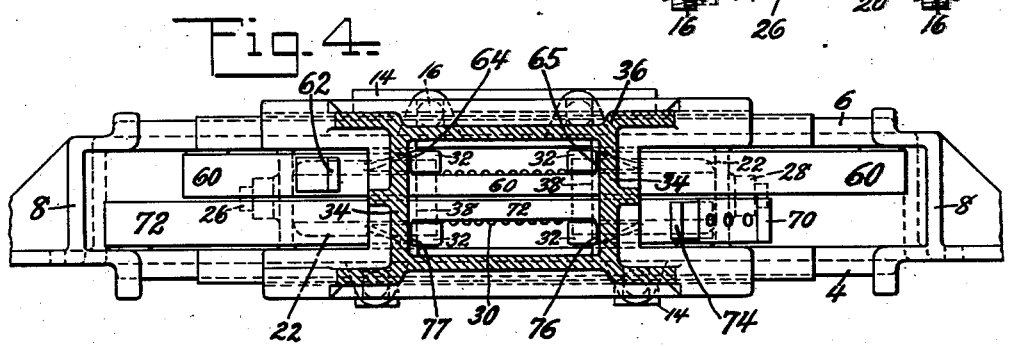
Fig. 4 is a sectional view through the coupler carrier and taken substantially on line 4—4 of Fig. 1.

Referring now to the drawings in detail, it will be seen that the coupler carrier has been illustrated as formed of a casting secured by any suitable means, such as bolts 2, to the flanges of the vertically extending vestibule posts P. The coupler carrier casting, as more clearly shown in Figs. 2 and 5, is formed with a front wall 4 of channel cross section and with a rear wall 6 also of channel cross section connected to the front wall by transversely extending end walls 8. The channel form front and rear walls are positioned with the flanges directed outwardly, as clearly shown, and the webs are connected together by additional transversely extending intermediate walls 10 providing therebetween space for the coupler centering mechanism later to be described. The upper portions of the front and rear walls are connected together and to the walls 8 and 10 by means of a top wall 12 which will provide a slide surface for the slides later to be described.

The lower portions of the front and rear walls may be joined integrally together between the transverse ribs 10 but for ease in repair they have been shown as joined together by a supporting plate 14 fastened to the lower flanges of the front and rear walls by any suitable means such as bolts 16. This supporting plate has riveted or otherwise secured thereto a renewable wear plate 18 adapted to cooperate with renewable wear plates 20 fastened to the lower portion of the spring followers 22. The spring followers are in general cup shaped and have the bottom 24 thereof adapted to contact and bear against the transverse wall 10 which will serve as a limiting stop. The bottom wall of each follower is pierced to receive a guiding and retaining bolt or rod 26 extending through the walls 10 and held in position by any suitable means such as nuts 28. Centering spring 30 surrounds the bolt or rod and bears at its ends upon the inner surface of the bottom of the cup like spring followers. This spring is normally inserted with a predetermined amount of compression, thus firmly holding the spring followers against the stops or walls 10. Each of the spring followers is formed adjacent its open end with upstanding lugs 32 adapted to project above the front and rear walls of the coupler carrier for engagement with the end walls 34 of the coupler saddle 36. As most clearly shown in Fig. 1 the lugs 32 and end wall 34 of the coupler saddle are provided with inclined surfaces 38 so arranged as to interlock and prevent separation of the parts when pressure is applied thereto. The coupler saddle, as clearly shown in Fig. 5, is formed with surfaces 40 adapted to slide upon the top of the end walls 4 and 6 being guided in its sliding movement by depending walls 42 overlapping the edges of the top flanges of the coupler carrier. The saddle is also provided with a surface 44 adapted to receive the shank 46 of the coupler. A certain amount of free motion between the coupler shank and saddle is permitted but excessive movement is limited by means of upstanding buttressed ribs 48 engaging the side walls of the coupler shank. These ribs may be curved or angularly arranged in order to prevent binding of the coupler shank as it swings about the vertically disposed coupler pin 50 (Fig. 6).

As is customary in passenger service a steam pipe 52 is carried by the car structure at one side of the coupler shank, while the brake pipe 54 and signal pipe 56 is carried at the other side of the coupler shank. As clearly shown in the figures, the steam pipe 52 is carried by clamps 58 mounted near the end of a pipe carrier or slide 60. This slide is supported by and adapted to slide upon the top walls 12 previously referred to and extends beneath the coupler saddle and between the lugs 32 of the spring followers. Mounted upon the slide 60 adjacent the steam pipe clamps is an upstanding buttress or stop 62 adapted to be engaged by the adjacent end wall of the coupler saddle after a predetermined movement of the saddle toward the stop. The slide 60 has a portion cut out in order to accommodate the upstanding lugs 32 of the spring followers and to form shoulders 64, 65, more clearly shown in Figs. 7, 8, which it will be seen normally hold the slide immovable. The brake and signal pipes are carried by clamps 66 and 68 respectively upon the upturned end 70 of slide 72. This slide, like slide 60, is provided adjacent the pipes with a buttress stop 74 adapted to be engaged by the adjacent end wall of the coupler saddle. Also the slide has a portion thereof cut out to provide shoulders 76, 77, as best shown in Figs. 6, 8, which shoulders are adapted to engage the adjacent upstanding lugs 32 of the spring followers and normally hold the slide immovable.

Figure 7:
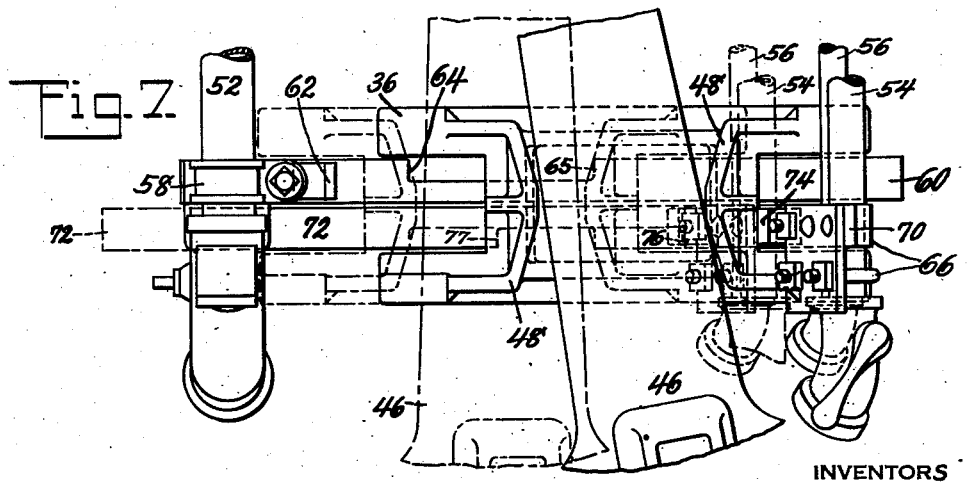
Fig. 7 is a similar plan view showing the position of the parts when the coupler has swung to the right.

From the preceding description of the parts it will be seen that normally the coupler shank can have small free movement with respect to the coupler saddle, such movement being permitted by the clearance between the shank and the upstanding ribs 48. It will also be seen that movement of the coupler shank to either side after it has contacted ribs 48 will cause one or the other of the spring followers to be moved, thereby compressing the spring 30 and storing energy therein which will return the coupler to centered position. A considerable amount of movement of the coupler saddle under control of the spring 30 is permitted before the saddle strikes stops 62 or 74 carried by pipe slides 60 and 72 respectively, thus the coupler may have considerable movement without in any way causing the pipes to be shifted. Normally, the pipes will be held against shifting due to the shoulders 64, 65 and 76, 77 engaging the spaced upstanding ears or lugs 32 of the spring followers. However, when the coupler saddle has moved sufficiently far to one side, such as shown in Fig. 6, the end wall of the saddle will strike the lug or stop 62 and carry slide 60 with it, moving the steam pipe from the position shown by line and dash in Fig. 6 to the full line position. Such movement of the slide is, of course, permitted since the lugs 32 of the right hand spring follower have moved out of the way of the adjacent shoulder 65 on the pipe slide 60. During movement of the coupler to the left, as shown in Fig. 6, slide 72 cannot move since the saddle is moving away from stop 74 and even if a slight frictional drag tended to move the pipe slide 72, such movement would be limited to a very small amount since the slide would strike the end wall 8 which is adjacent the steam pipe. Swinging of the coupler shank to the right, as shown in Fig. 7, will cause movement of the left hand spring follower, thereby compressing the spring and after a predetermined amount of movement the coupler saddle will strike stop 74 moving pipe slide 72 to the right until it assumes the full line position shown in Fig. 7. Here again, movement of slide 72 is permitted since the left hand spring follower has moved out of the way of shoulder 77, formed on the slide 72, and movement of slide 60 toward the right, even if it occurs, is limited by the slide striking the end wall 8 adjacent the brake and signal pipes. Thus it will be seen that the coupler may have a considerable predetermined movement without in any way causing movement of the pipe carrying slides. Further, it will be seen that even when excessive movement of the coupler causes movement of the pipe carrying slides only one slide at a time can move and this slide moves only a small amount, thereby relieving the pipes of excessive strain and the slides of excessive wear.

While the invention has been described more or less in detail, it will be obvious to persons skilled in the art that various modifications and rearrangements of parts may be made and all such modifications and rearrangements of parts are contemplated as will fall within the scope of the appended claims defining our invention.

What is claimed is:

1. In a coupler centering and pipe control device for railway cars, a transversely movable coupler, a coupler carrier secured to the car and extending transversely thereof, a coupler saddle slidably mounted on said carrier for movement therealong and supporting said coupler, a slide located on each side of the coupler and each supporting a pipe and resting upon said carrier for sliding movement along the carrier relative to each other and to the coupler saddle, yielding means normally holding said coupler and coupler saddle in a central position, and means carried by said slides and engageable with said saddle to move one of the slides after a predetermined transverse movement of said saddle from the normal central position.

2. In a coupler centering and pipe control device for railway cars, a transversely movable coupler, a coupler carrier secured to the car and extending transversely thereof, a coupler saddle slidably mounted on said carrier for movement therealong and supporting said coupler, yielding means normally holding said coupler and coupler saddle in a central position, a slide located on each side of the coupler and each supporting a pipe and being supported by said coupler carrier for movement along the carrier relative to each other and to the coupler saddle, and means to independently move the slide carrying the pipe toward which the coupler is moving and only after a predetermined transverse movement of said coupler saddle.

3. In a coupler centering and pipe control device for railway cars, a transversely movable coupler, a coupler carrier secured to the car and extending transversely thereof, a coupler saddle slidably mounted on said carrier for movement therealong and supporting said coupler, yielding means normally holding said coupler and coupler saddle in a central position, pipes located on either side of said coupler, a pair of pipe carrying slides supported by said coupler carrier for independent movement along the carrier relative to each other and to the coupler saddle, means to move the slide carrying the pipe toward which the coupler is moving and only after a predetermined movement of said coupler saddle, and means preventing any substantial movement of the slide carrying the pipe away from which the coupler is moving.

4. In a coupler centering and pipe control device for railways cars, a transversely movable coupler, a coupler carrier secured to the car and extending transversely thereof, a coupler saddle slidably mounted on said carrier for movement therealong and supporting said coupler, spring followers bearing upon said coupler carrier and being formed with lugs engaging the sides of said coupler saddle, a spring interposed between and urging apart said followers, pipes located upon each side of said coupler in spaced relation thereto, a pair of independent pipe carrying slides supported by said coupler carrier for transverse sliding movement relative to the car, means on said slides engaging said lugs and normally holding said slides against such movement and means on said slides engageable by said saddle to move the respective slide only after a predetermined movement of said saddle toward the pipe carried by the slide.

5. In a coupler centering and pipe control device for railway cars, a transversly movable coupler, a coupler carrier secured to the car and extending transversely thereof, a coupler saddle slidably mounted on said carrier for movement therealong and supporting said coupler, spring followers bearing upon said coupler carrier and being formed with lugs engaging the sides of said coupler saddle, a spring interposed between and urging apart said followers, pipes located upon each side of said coupler in spaced relation thereto, a pair of independent pipe carrying slides supported by said coupler carrier for transverse sliding movement relative to the car, means on said slides engaging said lugs and normally holding said slides against such movement and means on said slides engageable by said saddle to move the respective slide only after a predetermined movement of said saddle toward the pipe carried by the slide, and said slides engaging said carrier to prevent any substantial movement of the slide carrying the pipe away from which the coupler is moving.

6. In a coupler centering and pipe control device for railway cars, a transversely movable coupler, a coupler carrier secured to the car and extending transversely thereof, a coupler saddle slidably mounted on said carrier for movement therealong and supporting said coupler, yielding means normally holding said coupler and coupler saddle in a central position, a slide located on each side of the coupler and each carrying a pipe and being supported by said coupler carrier for controlled transverse movement relative to the car in one direction only from its normal position and after a predetermined transverse movement of said coupler.

7. In a coupler centering and pipe control device for railway cars, a transversely movable coupler, a coupler carrier secured to the car and extending transversely thereof, a coupler saddle slidably mounted on said carrier for moment therealong and supporting said coupler, yielding means normally holding said coupler and coupler saddle in a central position, a slide located on each side of the coupler and each carrying a pipe and being supported by said coupler carrier for controlled transverse movement relative to the car in one direction only from its normal position in which it is held in a central position by said yielding means, and means for moving said slides in conjunction with said coupler only after a predetermined transverse movement of the coupler.

JAMES P. GOLDEN.
GLENNON A. MEYER.